United States Patent
Zhong

(10) Patent No.: US 9,139,775 B2
(45) Date of Patent: *Sep. 22, 2015

(54) LIQUID CRYSTAL MEDIUM COMPOSITION FOR USE IN LIQUID CRYSTAL DISPLAY

(75) Inventor: Xinhui Zhong, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 97 days.

This patent is subject to a terminal disclaimer.

(21) Appl. No.: 13/807,392

(22) PCT Filed: Jul. 6, 2012

(86) PCT No.: PCT/CN2012/078264
§ 371 (c)(1),
(2), (4) Date: Dec. 28, 2012

(87) PCT Pub. No.: WO2013/185396
PCT Pub. Date: Dec. 19, 2013

(65) Prior Publication Data
US 2014/0231711 A1    Aug. 21, 2014

(30) Foreign Application Priority Data
Jun. 15, 2012 (CN) .......................... 2012 1 0198996

(51) Int. Cl.
| | | |
|---|---|---|
| G02F 1/1333 | (2006.01) |
| C09K 19/54 | (2006.01) |
| C09K 19/06 | (2006.01) |
| C09K 19/32 | (2006.01) |
| C09K 19/30 | (2006.01) |
| C09K 19/04 | (2006.01) |
| C09K 19/12 | (2006.01) |
| G02F 1/1337 | (2006.01) |
| G02F 1/137 | (2006.01) |

(52) U.S. Cl.
CPC ............. *C09K 19/542* (2013.01); *C09K 19/062* (2013.01); *C09K 19/3028* (2013.01); *C09K 19/322* (2013.01); *C09K 19/54* (2013.01); *C09K 2019/0448* (2013.01); *C09K 2019/122* (2013.01); *C09K 2019/548* (2013.01); *G02F 1/133703* (2013.01); *G02F 1/133707* (2013.01); *G02F 1/133788* (2013.01); *G02F 2001/13712* (2013.01); *G02F 2001/133776* (2013.01)

(58) Field of Classification Search
CPC .. C09K 19/542; C09K 19/062; C09K 19/322; C09K 19/54; C09K 19/3028; C09K 2019/0448; C09K 2019/122; C09K 2019/548; G02F 1/133703; G02F 1/133707; G02F 1/133788; G02F 2001/133776; G02F 2001/13712
USPC .................... 428/1.1, 1.3; 252/299.5, 299.63, 252/299.66; 349/167, 183
See application file for complete search history.

(56) References Cited

U.S. PATENT DOCUMENTS

| | | | |
|---|---|---|---|
| 7,731,865 B2 * | 6/2010 | Bernatz et al. ........... 252/299.01 |
| 2014/0085572 A1 * | 3/2014 | Feng et al. ...................... 349/86 |
| 2014/0085591 A1 * | 3/2014 | Feng et al. ................... 349/183 |
| 2014/0085593 A1 * | 3/2014 | Feng et al. ................... 349/183 |
| 2014/0085595 A1 * | 3/2014 | Feng et al. ................... 349/183 |

FOREIGN PATENT DOCUMENTS

| | | |
|---|---|---|
| CN | 102161893 A | 8/2011 |
| CN | 102786936 A | 11/2012 |

* cited by examiner

*Primary Examiner* — Geraldina Visconti
(74) *Attorney, Agent, or Firm* — Andrew C. Cheng

(57) ABSTRACT

The present invention provides a liquid crystal medium composition for use in liquid crystal display, which includes the following constituent components: a negative type liquid crystal material, a stabilizer, and two or more than two polymerizable monomers that undergo polymerization reactions under UV radiation. The polymerizable monomers are in an amount of 0.1-1% by weight based on total weight of the liquid crystal medium composition. The polymerizable monomers have a structural formula composed of a single benzene ring, two benzene rings, or a naphthalene ring. The structural formula composed of two benzene rings is formed by two benzene rings that are directly linked or linked via a moiety. The benzene ring and naphthalene ring are directly linked at least one polymerizable moiety. Through use of two or more than two polymerizable monomers in the liquid crystal medium composition, polymer bumps having a small size and excellent homogeneity can be obtained.

10 Claims, 6 Drawing Sheets

LIQUID CRYSTAL MEDIUM COMPOSITION FOR USE IN LIQUID CRYSTAL DISPLAY

BACKGROUND OF THE INVENTION

1. Field of the Invention

The present invention relates to the field of liquid crystal displaying techniques, and in particular to a liquid crystal medium composition for use in liquid crystal display.

2. The Related Arts

Liquid crystal used in twisted nematic (TN) or super twisted nematic (STN) liquid crystal display is positive liquid crystal. The liquid crystal molecules have a long axis that is arranged parallel to a substrate surface when no electricity is applied. The orientation of the liquid crystal molecules on the substrate surface is determined by rubbing direction of an alignment layer (which is usually made of polyimide). The alignment directions of two substrate surfaces are perpendicular to each other, whereby the molecules of the liquid crystal layer exhibit a continuously twisted arrangement from one substrate surface to another substrate surface. When a voltage is applied, the long axis of the liquid crystal molecule tends to align in the direction of electric field. Drawbacks of the TN or STN liquid crystal display are small viewable angle and severe brightness difference and color difference at large view angles. A compensation film must be applied to correct these problems and this increases the manufacture cost of display devices.

Multi-domain vertical alignment (MVA) thin-film transistor liquid crystal display (TFT-LCD) provides an excellent solution to the view angle limitation that the TN or STN displays are subjected to and negative liquid crystal and vertical alignment film are used. When no voltage is applied, the long axis of liquid crystal molecule is perpendicular to the substrate surface. Application of voltage would cause the liquid crystal molecule to tilt, making the long axis of the liquid crystal molecule aligning in a direction perpendicular to the electric field. To overcome the view angle problem, a pixel is divided into multiple domains and liquid crystal molecules are caused to tilt in different directions so that the display, when viewed from different directions, can provide similar viewing effect. Several ways can be adopted to have liquid crystal molecules of different domains of a pixel oriented in different directions. As shown in FIG. 1A, the first way is to form polymer bumps 108 on upper and lower glass substrates 102, 103 by means of exposure development in order to cause a pre-tilt angle for liquid crystal molecules around the polymer bumps 108 and thus guiding the liquid crystal molecules 106 to tilt to predetermined directions. As shown in FIG. 1B, the second way is to form an ITO pixel electrode 304 on upper and lower glass substrates 302, 303 in such a way as forming a predetermined pattern so that an electric field so induced shows a predetermined tilt angle thereby controlling the orientations of the liquid crystal molecules 306 in different domains. This technique is often referred to as patterned vertical alignment (PVA). As shown in FIG. 2, the third way is to form ITO slits 501 on a TFT side of a lower glass substrate 500, while ITO of an upper glass substrate 502 remains full. Polymerizable monomers 508 are added in the liquid crystal medium. An electric field is first applied to cause tilting of the liquid crystal molecules 506 and then ultraviolet ray is applied to irradiate the panel so as to polymerize the monomers to form polymer bumps 510 that guide tilting of the liquid crystal molecules and are deposited on the surfaces of the upper and lower glass substrates 500, 502 to achieve an effect of alignment. This technique is referred to as polymer stabilized vertical alignment (PSVA).

The formation of polymer bumps in the PSVA technique is a phase separation process. Before polymerization, the monomers are small molecules and show good compatibility with the liquid crystal medium composition. After being irradiated by ultraviolet light and undergoing polymerization, the monomers form high molecules that are separated from the liquid crystal medium composition so as to form polymer bumps that are insoluble in the liquid crystal medium. These are polymer bumps that show an effect of alignment. However, the known techniques do not show how to control the degree of polymerization of reactive mesogenic (RM) monomers and the size of the polymerized particles. Such characteristics are of vital influence for the effect of alignment and optic performance of panels. Taking the conventionally used material as an example, if the intensity of the irradiation light is weak, then the reaction rate of RM is slow and if the intensity of irradiation light is strong, the reaction rate of RM is fast, which may lead to the formation of excessively large particles of polymerization, whereby the alignment effect is poor, undersize spots may be formed, leakage in dark state may occur, and contrast is reduced. Thus, the key issue of the PSVA technique is controlling the reaction of the monomers in order to form bumps that are of suitable sizes and uniformly distributed and thus preventing poor alignment of liquid crystal and occurrence of bright spots in dark state of liquid crystal panels and obtaining excellent optic performance of the panel, such as high contrast and fast response.

Referring to FIGS. 3-5, the known techniques use only a single type of monomer, making it easy to cause undesired situations, such as easy occurrence of bumps formed by excessively large particles due to variation of light irradiation conditions, so that undersize bright spots may be seen in a dark state of a PSVA panel and the contrast of the panel is reduced. Thus, further improvement may be made on the liquid crystal medium composition for the PSVA techniques.

SUMMARY OF THE INVENTION

An object of the present invention is to provide a liquid crystal medium composition for use in liquid crystal display, which comprises two or more than two polymerizable monomers that undergo polymerization reactions when irradiated by ultraviolet light in order to control the size and homogeneity of the polymer bumps formed with the polymerization reactions for preventing poor alignment of liquid crystal and occurrence of dark-state bright spots of liquid crystal panel thereby providing the liquid crystal panel with excellent optic performance.

To achieve the object, the present invention provides a liquid crystal medium composition for use in liquid crystal display, comprising: a negative type liquid crystal material, a stabilizer, and two or more than two polymerizable monomers that undergo polymerization reactions under UV radiation. The polymerizable monomers are in an amount of 0.1-1% by weight based on total weight of the liquid crystal medium composition. The polymerizable monomers have a structural formula composed of a single benzene ring, two benzene rings, or a naphthalene ring. The structural formula composed of two benzene rings is formed by two benzene rings that are directly linked or linked via a moiety. The benzene ring and naphthalene ring are directly linked at least one polymerizable moiety.

The two or more than two polymerizable monomers have a structural formula represented by at least one of the following formulas and the two or more than two polymerizable monomers have different moiety numbers when the structural formulas are identical:

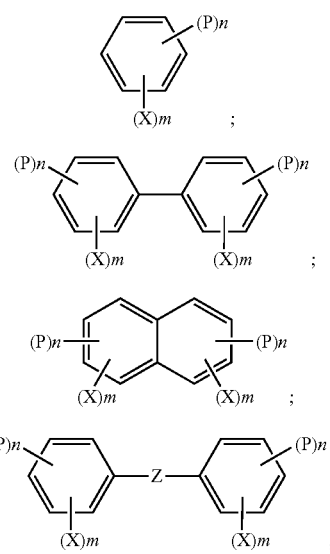

formula I formula II formula III formula IV wherein in formulas I to IV, P represents a polymerizable moiety that is selected from at least one of methacrylate, acrylate, ethenyl, ethyleneoxy or epoxy groups; n is the number of polymerizable moiety P linked to the same aromatic ring, n being an integer of 1-3, each polymerizable moiety being identical or different when n>1; X represents a substituted moiety selected from at least one of —F, —Cl, —Br, methyl, —CN, and C2-8 linear or branched alkyl, one or more of non-adjacent methyls in the alkyl being selectively substituted by oxygen or sulfur; m represents the number of substituted moiety X that is linked to the same aromatic ring, m being an integer of 1-3, each substituted moiety being identical or different when m>1; n+m is smaller than the number of moieties on the same aromatic ring; and where in formula IV, Z represents —O—, —COO—, —OCO—, —CH$_2$O—, —OCH$_2$O—, —O(CH$_2$)$_2$O—, —COCH$_2$—, methylenyl, —C≡C—,

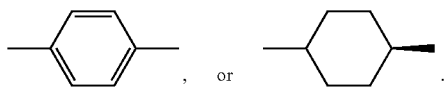

Hydrogen of any one aromatic ring of the polymerizable monomers is selectively substituted by following moieties: —F, —Cl, —Br, methyl, or —CN.

Hydrogen of any non-aromatic ring of the polymerizable monomers is selectively substituted by following moieties: —F, —Cl, —Br, or methyl.

The negative type liquid crystal material comprises at least one liquid crystal compound represented by the following formula:

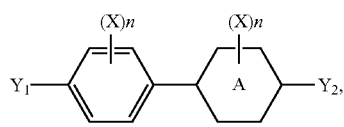

wherein

is

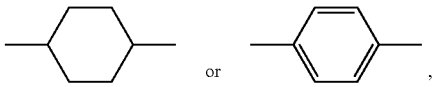

X represents the substituted moieties linked to the rings and is selected from at least one of —H, —F, —Cl, —Br, —I, —CN, and —NO$_2$; n is an integer of 1-4, n being identical or different for different rings, the substituted moieties X being identical or different when n>1; Y$_1$ and Y$_2$ are —R, —O—R, —CO—R, —OCO—R, —COO—R, or —(OCH$_2$CH$_2$)$_{n1}$CH$_3$, R representing a C1-12 linear or branched alkyl, n1 being an integer of 1-5, Y$_1$ and Y$_2$ being identical or different.

The stabilizer comprises at least one compound represented by the following formula:

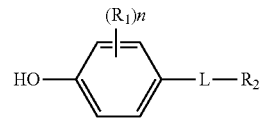

wherein R$_1$ represents at least one of C1-9 linear or branched alkyl, n being an integer of 1-4, the substituted moieties R$_1$ being identical or different when n>1; R$_2$ represents a C1-36 linear or branched alkyl; and L is a carbon-carbon single bond, —O—, —COO—, —OCO—, —CH$_2$O—, —OCH$_2$O—, —O(CH$_2$)$_2$O—, —COCH$_2$—, or methylenyl.

The polymerizable monomers are selected from two or three of the following structural formulas:

formula V

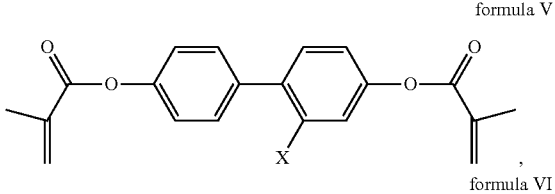

formula VI formula VII

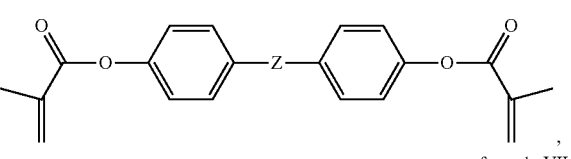

wherein in formula V, X is —F or —CN; in formulas VI and VII, Z is —O—, —COO—, —COO—, —CH$_2$O—, —OCH$_2$O—, —O(CH$_2$)$_2$O—, —COCH$_2$—, methylenyl, —C≡C—,

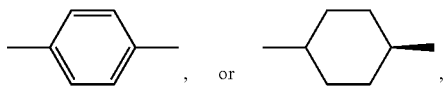

any one of said two or three of the polymerizable monomers having a molar ratio less than or equal to 98% based on the total weight.

The negative type liquid crystal material comprises:

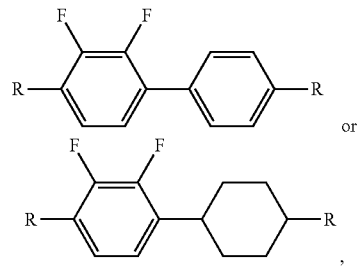

wherein in the above formulas, R is a C1-9 linear or branched alkyl, one or more of non-adjacent methyls in the alkyl being selectively substituted by oxygen or sulfur; the negative type liquid crystal material is in an amount of 20-90% by weight based on the total weight of the liquid crystal medium composition.

The stabilizer comprises at least one compound represented by the following formula:

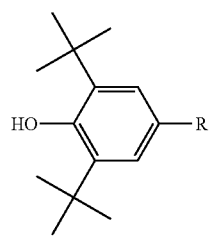

wherein R is a C1-30 linear or branched alkyl, one or more of non-adjacent methyls in the alkyl being selectively substituted by oxygen or sulfur.

The stabilizer is in an amount less than 1% by weight based on the total weight of the liquid crystal medium composition.

The present invention also provides a liquid crystal medium composition for use in liquid crystal display, comprising: a negative type liquid crystal material, a stabilizer, and two or more than two polymerizable monomers that undergo polymerization reactions under UV radiation, the polymerizable monomers being in an amount of 0.1-1% by weight based on total weight of the liquid crystal medium composition, the polymerizable monomers having a structural formula composed of a single benzene ring, two benzene rings, or a naphthalene ring, the structural formula composed of two benzene rings being formed by two benzene rings that are directly linked or linked via a moiety, the benzene ring and naphthalene ring being directly linked at least one polymerizable moiety;

wherein the two or more than two polymerizable monomers have a structural formula represented by at least one of the following formulas and the two or more than two polymerizable monomers have different moiety numbers when the structural formulas are identical:

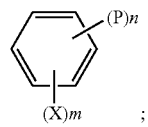
formula I

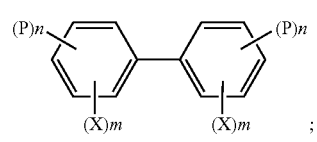
formula II

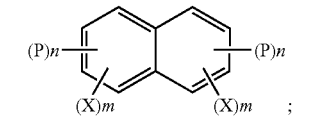
formula III

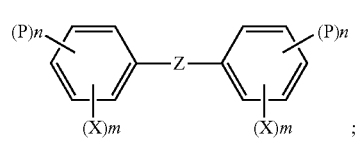
formula IV wherein in formulas I to IV, P represents a polymerizable moiety that is selected from at least one of methacrylate, acrylate, ethenyl, ethyleneoxy or epoxy groups; n is the number of polymerizable moiety P linked to the same aromatic ring, n being an integer of 1-3, each polymerizable moiety being identical or different when n>1; X represents a substituted moiety selected from at least one of —F, —Cl, —Br, methyl, —CN, and C2-8 linear or branched alkyl, one or more of non-adjacent methyls in the alkyl being selectively substituted by oxygen or sulfur; m represents the number of substituted moiety X that is linked to the same aromatic ring, m being an integer of 1-3, each substituted moiety being identical or different when m>1; n+m is smaller than the number of moieties on the same aromatic ring; and where in formula IV, Z represents —O—, —COO—, —OCO—, —CH$_2$O—, —OCH$_2$O—, —O(CH$_2$)$_2$O—, —COCH$_2$—, methylenyl, —C≡C—

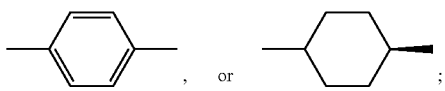

wherein hydrogen of any one aromatic ring of the polymerizable monomers is selectively substituted by following moieties: —F, —Cl, —Br, methyl, or —CN;

wherein hydrogen of any non-aromatic ring of the polymerizable monomers is selectively substituted by following moieties: —F, —Cl, —Br, or methyl;

wherein the negative type liquid crystal material comprises at least one liquid crystal compound represented by the following formula:

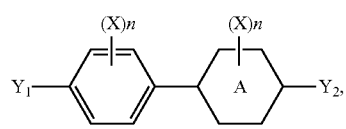

wherein

is

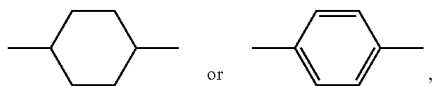

X represents the substituted moieties linked to the rings and is selected from at least one of —H, —F, —Cl, —Br, —I, —CN, and —NO$_2$; n is an integer of 1-4, n being identical or different for different rings, the substituted moieties X being identical or different when n>1; Y$_1$ and Y$_2$ are —R, —O—R, —CO—R, —OCO—R, —COO—R, or —(OCH$_2$CH$_2$)$_{n1}$CH$_3$, R representing a C1-12 linear or branched alkyl, n1 being an integer of 1-5, Y$_1$ and Y$_2$ being identical or different;

wherein the stabilizer comprises at least one compound represented by the following formula:

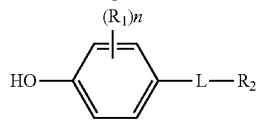

wherein R$_1$ represents at least one of C1-9 linear or branched alkyl, n being an integer of 1-4, the substituted moieties R$_1$ being identical or different when n>1; R$_2$ represents a C$_{1-36}$ linear or branched alkyl; and L is a carbon-carbon single bond, —O—, —COO—, —OCO—, —CH$_2$O—, —OCH$_2$O—, —O(CH$_2$)$_2$O—, —COCH$_2$—, or methylenyl;

wherein the polymerizable monomers are selected from two or three of the following structural formulas:

formula V

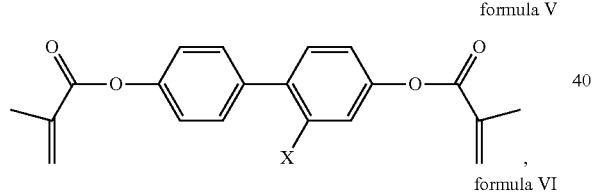

formula VI

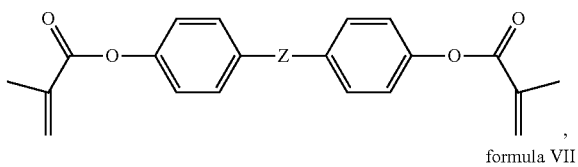

formula VII

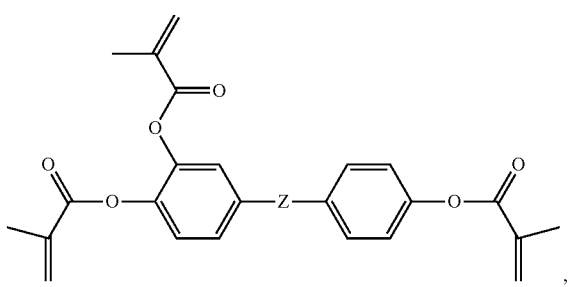

wherein in formula V, X is —F or —CN; in formulas VI and VII, Z is —O—, —COO—, —OCO—, —CH$_2$O—, —OCH$_2$O—, —O(CH$_2$)$_2$O—, —COCH$_2$—, methylenyl, —C≡C—,

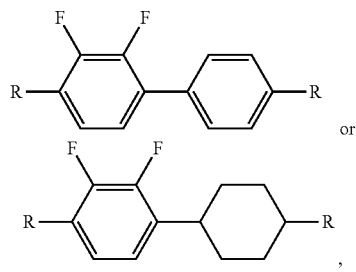

any one of said two or three of the polymerizable monomers having a molar ratio less than or equal to 98% based on the total weight;

wherein the negative type liquid crystal material comprises:

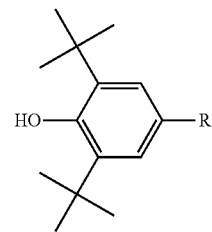

wherein in the above formulas, R is a C1-9 linear or branched alkyl, one or more of non-adjacent methyls in the alkyl being selectively substituted by oxygen or sulfur; the negative type liquid crystal material is in an amount of 20-90% by weight based on the total weight of the liquid crystal medium composition;

wherein the stabilizer comprises at least one compound represented by the following formula:

wherein R is a C1-30 linear or branched alkyl, one or more of non-adjacent methyls in the alkyl being selectively substituted by oxygen or sulfur; and wherein the stabilizer is in an amount less than 1% by weight based on the total weight of the liquid crystal medium composition.

The efficacy of the present invention is that in the liquid crystal medium composition for use in liquid crystal display, through use of two or more than two polymerizable monomers that undergo polymerization reactions under the radiation of ultraviolet lights and adopting a proper ratio therebetween, polymer bumps having a small size and excellent homogeneity can be obtained through the polymerization reactions, whereby poor alignment of liquid crystal and the occurrence of dark state bright spots can be prevented to thus make the response of the liquid crystal panel fast and provide a high contrast.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

Figure 1A:
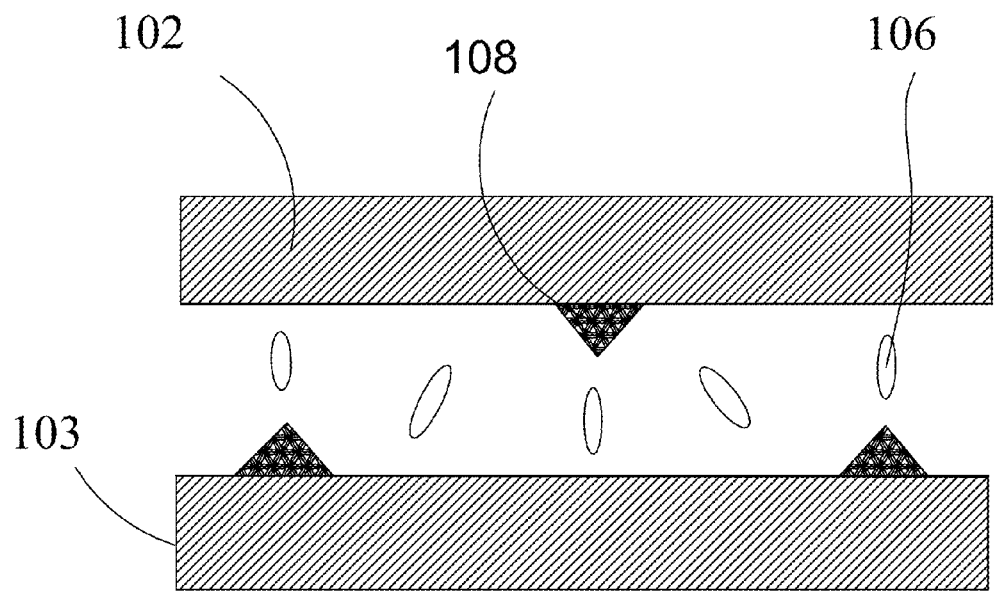
FIG. 1A is a schematic view illustrating the state of a liquid crystal medium layer after liquid crystal alignment of a liquid crystal display formed with exposure development techniques.
Figure 1B:
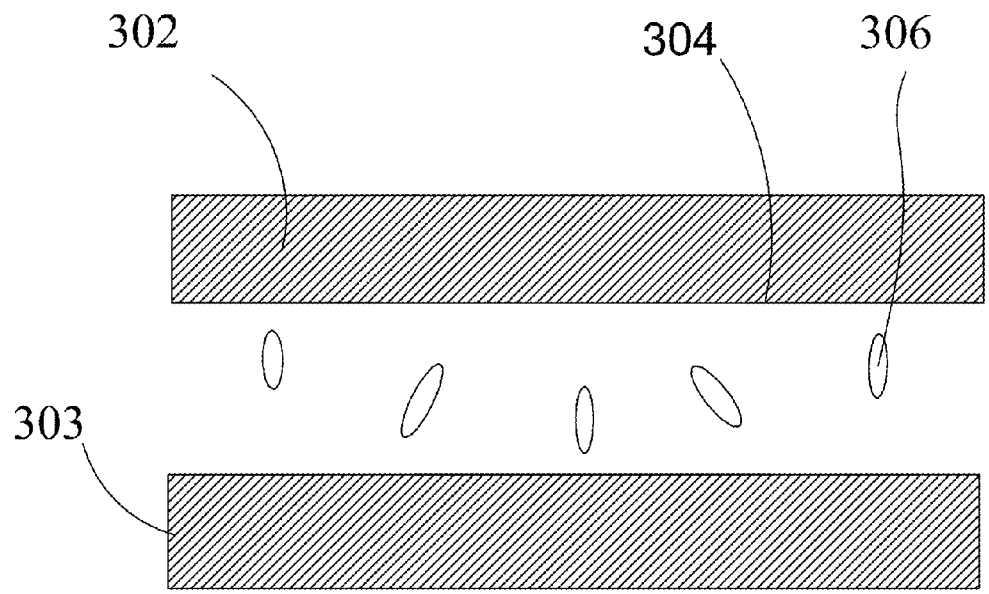
FIG. 1B is a schematic view illustrating the state of a liquid crystal medium layer after liquid crystal alignment of a liquid crystal display formed with vertical alignment techniques.
Figure 2:
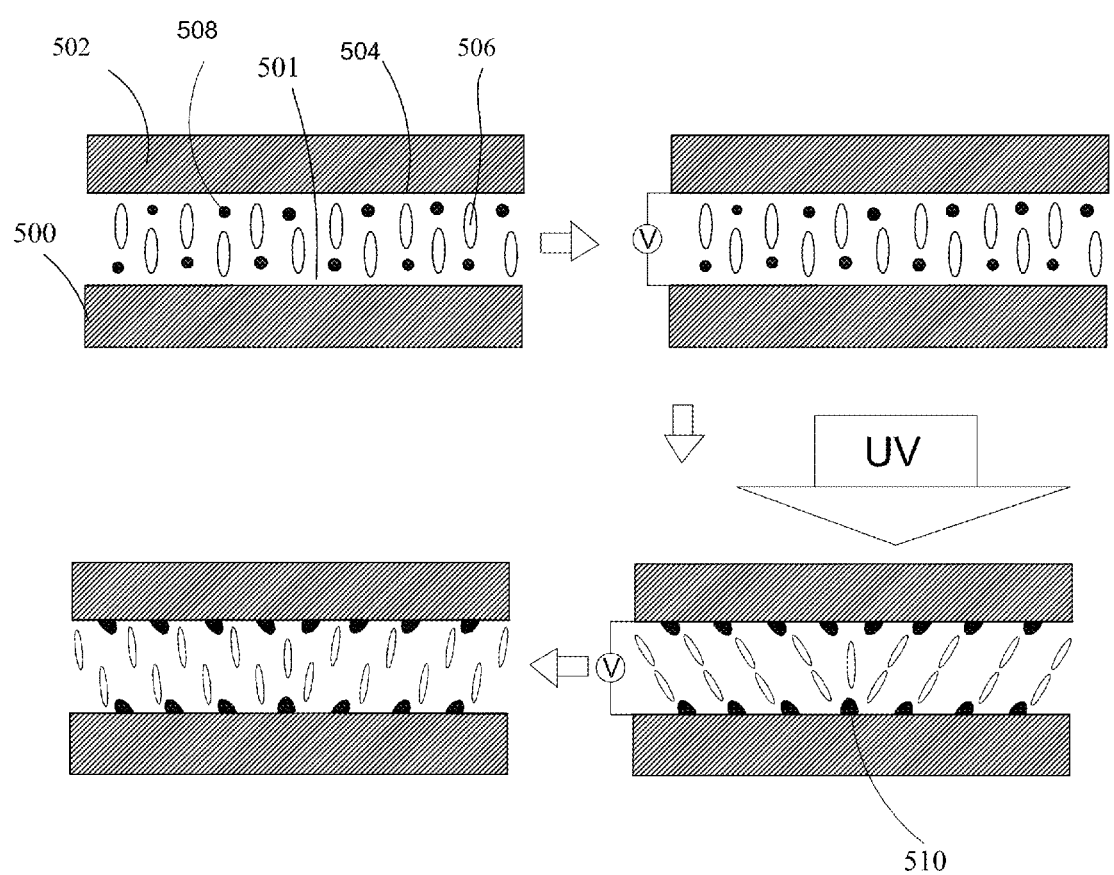
FIG. 2 is a schematic view illustrating liquid crystal alignment process of a liquid crystal display formed with polymer stabilized vertical alignment techniques.
Figure 3:
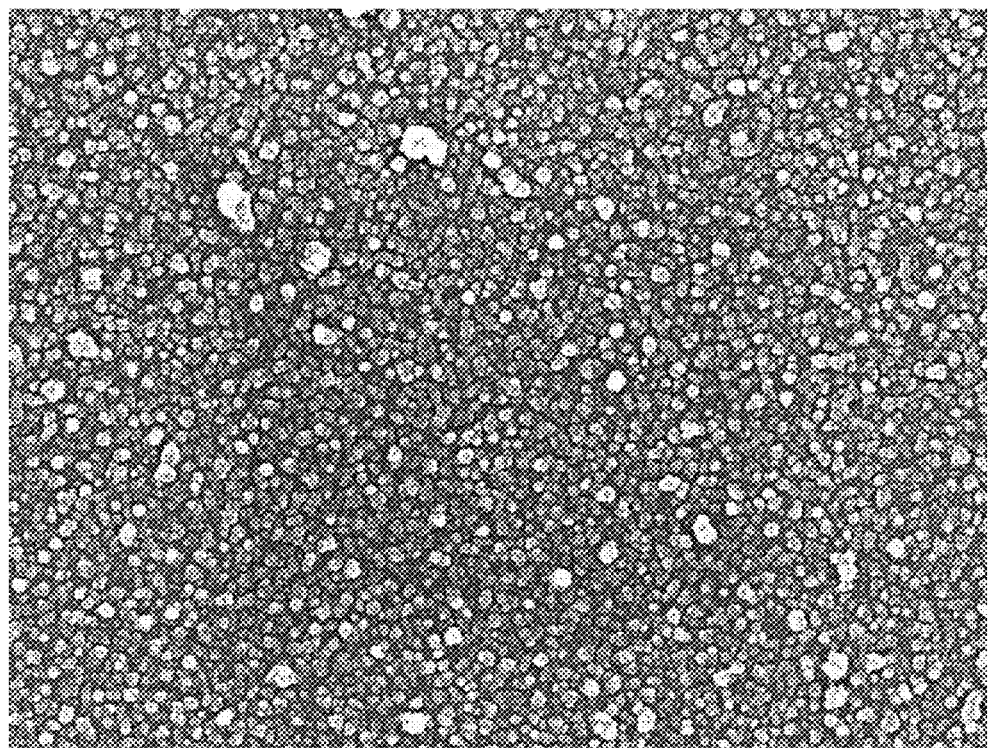
FIGS. 3-5 are respectively types of polymer bumps formed through polymerization of different types of single polymerizable monomer used in liquid crystal medium composition of liquid crystal display.
Figure 4:
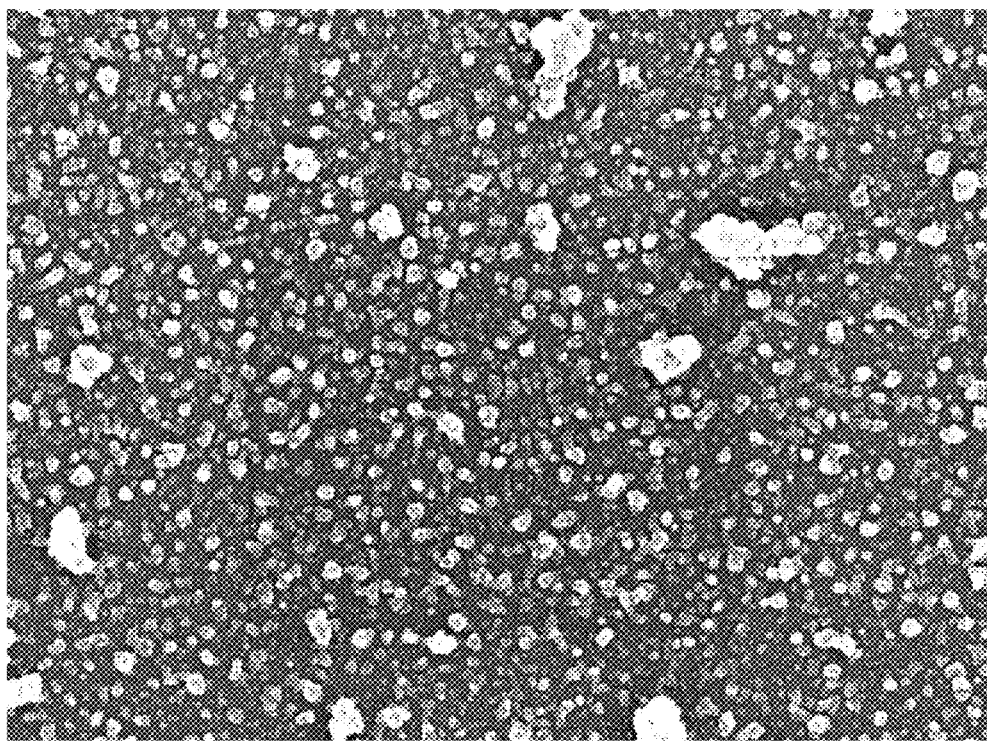
Figure 5:
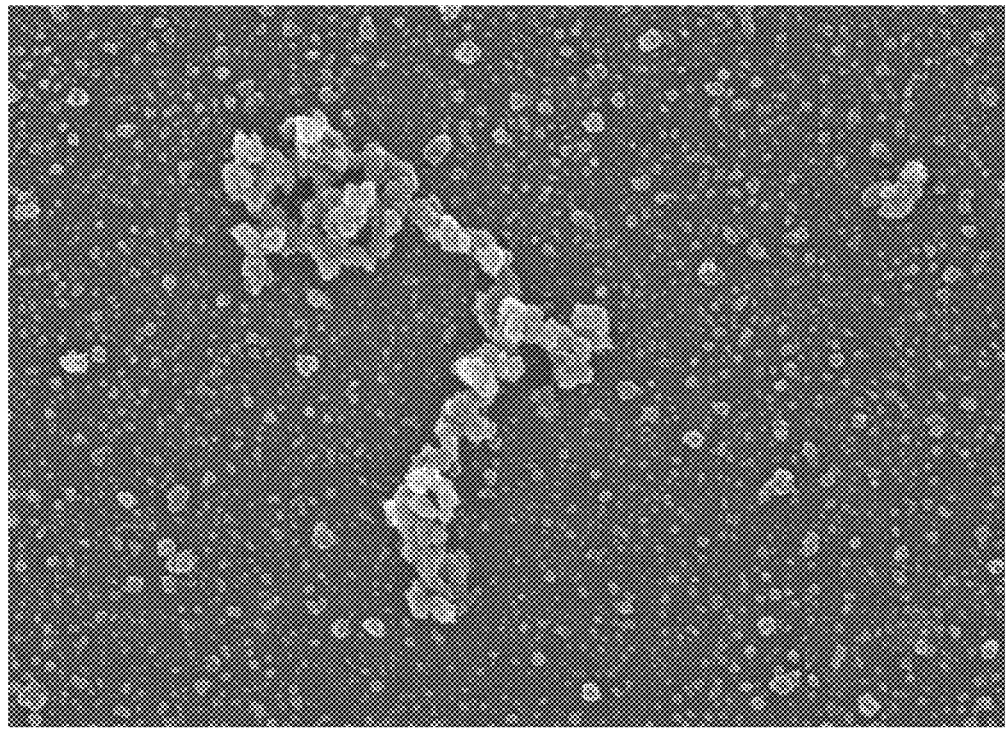

To further expound the technical solution adopted in the present invention and the advantages thereof, a detailed description is given to a preferred embodiment of the present invention and the attached drawings.

The present invention provides a liquid crystal medium composition. The liquid crystal medium composition comprises a negative type liquid crystal material, a stabilizer, and two or more than two polymerizable monomers that undergo polymerization reactions under UV radiation. The polymerizable monomers are in an amount of 0.1-1% by weight based on total weight of the liquid crystal medium composition. The polymerizable monomers have a structural formula composed of a single benzene ring, two benzene rings, or a naphthalene ring. The structural formula composed of two benzene rings is formed by two benzene rings that are directly linked or linked via a moiety. The benzene ring and naphthalene ring are directly linked at least one polymerizable moiety.

The two or more than two polymerizable monomers have a structural formula represented by at least one of the following formulas and the two or more than two polymerizable monomers have different moiety numbers when the structural formulas are identical:

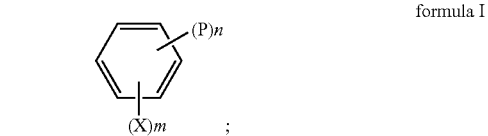

formula I

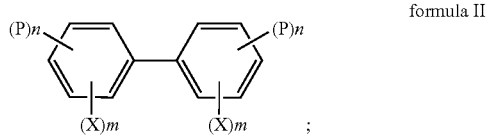

formula II

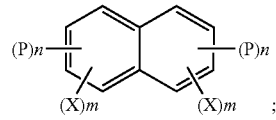

formula III

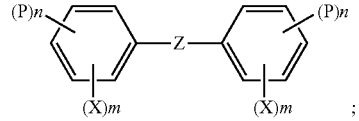

formula IV wherein in formulas I to IV, P represents a polymerizable moiety that is selected from at least one of methacrylate, acrylate, ethenyl, ethyleneoxy or epoxy groups; n is the number of polymerizable moiety P linked to the same aromatic ring, n being an integer of 1-3, each polymerizable moiety being identical or different when n>1; the polymerizable moiety P is directly linked to benzene ring without intervening moiety; the single benzene ring is selectively linked with a plurality of polymerizable moieties; X represents a substituted moiety selected from at least one of —F, —Cl, —Br, methyl, —CN, and C2-8 linear or branched alkyl, one or more of non-adjacent methyls in the alkyl being selectively substituted by oxygen or sulfur; m represents the number of substituted moiety X that is linked to the same aromatic ring, m being an integer of 1-3, each substituted moiety being identical or different when m>1; n+m is smaller than the number of moieties on the same aromatic ring; and where in formula IV, Z represents —O—, —COO—, —OCO—, —CH$_2$O—, —OCH$_2$O—, —O(CH$_2$)$_2$O—, —COCH$_2$—, methylenyl, —C≡C—,

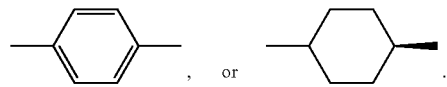

Hydrogen of any one aromatic ring of the polymerizable monomers is selectively substituted by following moieties: —F, —Cl, —Br, methyl, or —CN.

Hydrogen of any non-aromatic ring of the polymerizable monomers is selectively substituted by following moieties: —F, —Cl, —Br, or methyl.

The negative type liquid crystal material comprises at least one liquid crystal compound represented by the following formula:

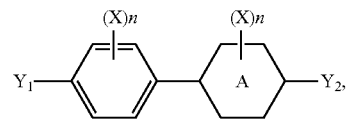

wherein

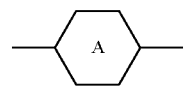

is

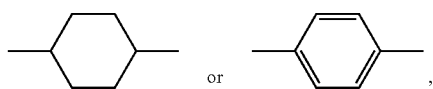

X represents the substituted moieties linked to the rings and is selected from at least one of —H, —F, —Cl, —Br, —I, —CN, and —NO$_2$; n is an integer of 1-4, n being identical or different for different rings, the substituted moieties X being identical or different when n>1; Y$_1$ and Y$_2$ are —R, —O—R, —CO—R, —OCO—R, —COO—R, or —(OCH$_2$CH$_2$)$_{n1}$CH$_3$, R representing a C1-12 linear or branched alkyl, n1 being an integer of 1-5, Y$_1$ and Y$_2$ being identical or different.

The stabilizer comprises at least one compound represented by the following formula:

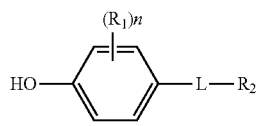

wherein R$_1$ represents at least one of C1-9 linear or branched alkyl, n being an integer of 1-4, the substituted moieties R$_1$ being identical or different when n>1; R$_2$ represents a C1-36 linear or branched alkyl; and L is a carbon-carbon single bond, —O—, —COO—, —OCO—, —CH$_2$O—, —OCH$_2$O—, —O(CH$_2$)$_2$O—, —COCH$_2$—, or methylenyl.

The polymerizable monomers are selected from two or three of the following structural formulas:

formula V

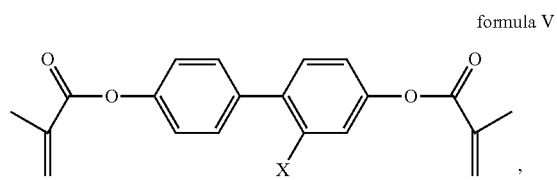

formula VI

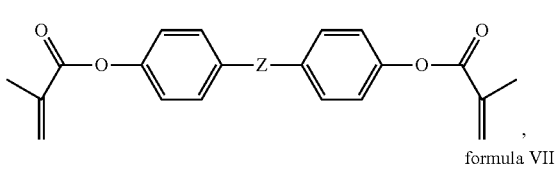

formula VII

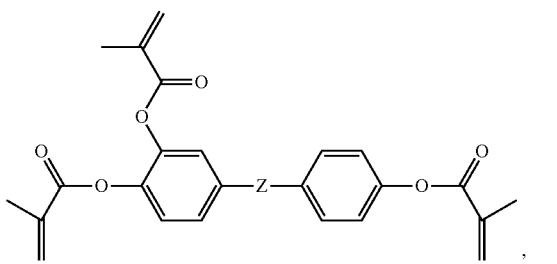

wherein in formula V, X is —F or —CN; in formulas VI and VII, Z is —O—, —COO—, —COO—, —CH$_2$O—, —OCH$_2$O—, —O(CH$_2$)$_2$O—, —COCH$_2$—, methylenyl, —C≡C—,

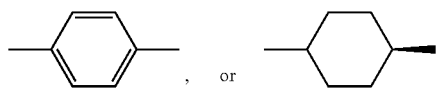

Any one of said two or three of the polymerizable monomers has a molar ratio less than or equal to 98% based on the total weight.

The negative type liquid crystal material comprises:

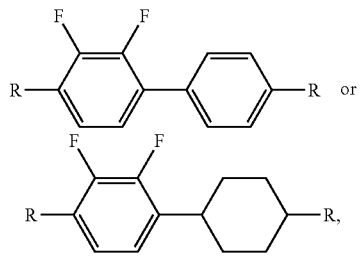

wherein in the above formulas, R is a C1-9 linear or branched alkyl, one or more of non-adjacent methyls in the alkyl being selectively substituted by oxygen or sulfur; the negative type liquid crystal material is in an amount of 20-90% by weight based on the total weight of the liquid crystal medium composition.

The stabilizer comprises at least one compound represented by the following formula:

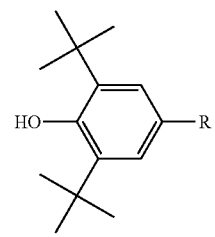

wherein R is a C1-30 linear or branched alkyl, one or more of non-adjacent methyls in the alkyl being selectively substituted by oxygen or sulfur. The stabilizer is in an amount less than 1% by weight based on the total weight of the liquid crystal medium composition.

Embodiments of the present invention will be further described with reference to the examples given below.

Example 1

The liquid crystal medium composition comprises a negative type liquid crystal material, a stabilizer, and two polymerizable monomers. The negative type liquid crystal material has a formula as follows:

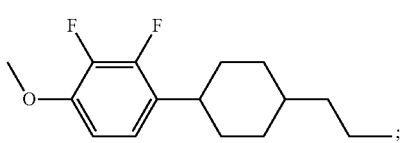 [SMILES: CCCC1CCC(c2ccc(OC)c(F)c2F)CC1]

and
the stabilizer has a formula as follows:

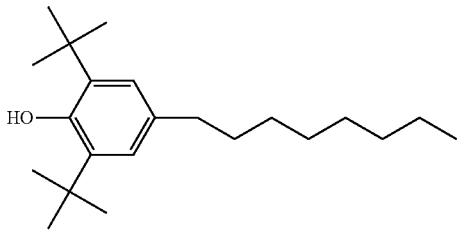

The two polymerizable monomoers are respectively RM-A1 and RM-B1, wherein RM-A1 has a formula as follows:

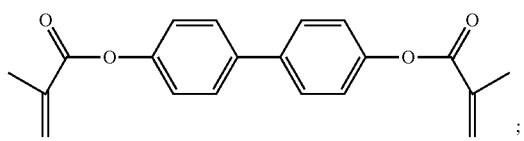 [SMILES: C=C(C)C(=O)Oc1ccc(-c2ccc(OC(=O)C(=C)C)cc2)cc1]

and
RM-B1 has a formula as follows:

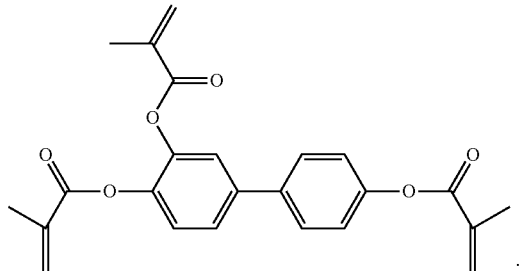 [SMILES: C=C(C)C(=O)Oc1ccc(-c2ccc(OC(=O)C(=C)C)c(OC(=O)C(=C)C)c2)cc1]

Figure 6:
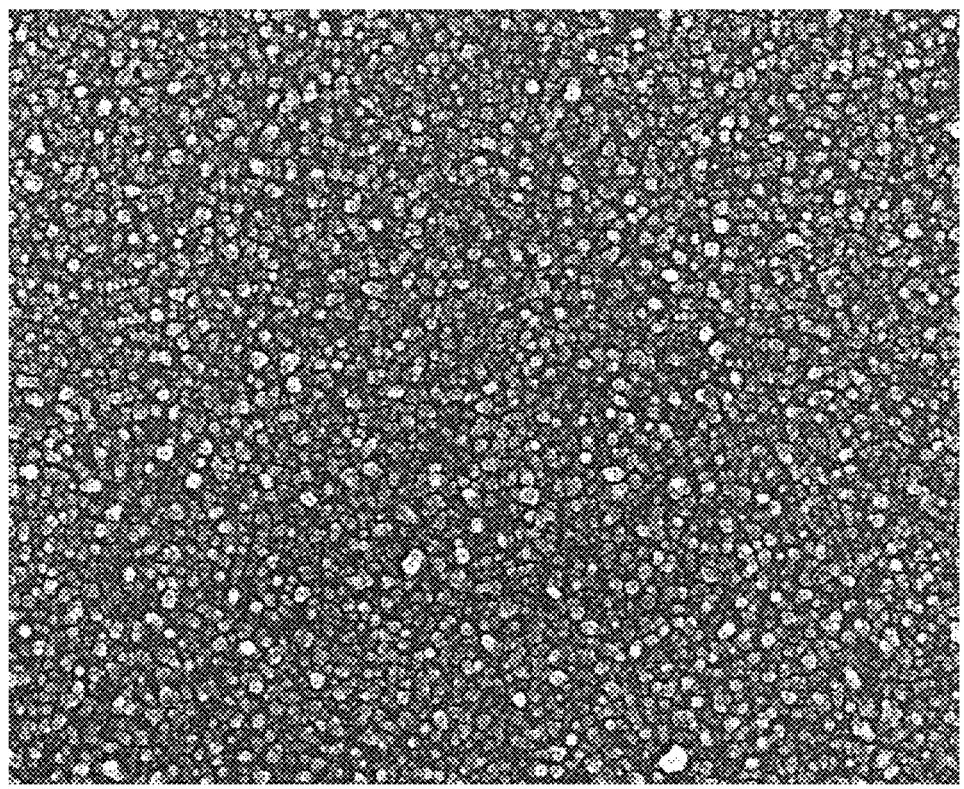
FIG. 6 illustrates a type of polymer bump formed through polymerization of two types of polymerizable monomer used in combination in liquid crystal medium composition of liquid crystal display according to an embodiment of the present invention.

Molar ratio between RM-A1 and RM-B1 is 1:5 and the total amount of the two is 3000 ppm of the liquid crystal medium composition. In the liquid crystal medium composition, polymer bumps formed by using the mixture of RM-A1 and RM-B1 has a small size and is homogenous, see FIG. 6, and shows no dark state lighting phenomenon.

Example 2

In this example, the negative type liquid crystal material and stabilizer used are identical to those of Example 1. The two polymerizable monomers used are respectively referred to as RM-A2 and RM-B2, wherein RM-A2 has a formula as follows:

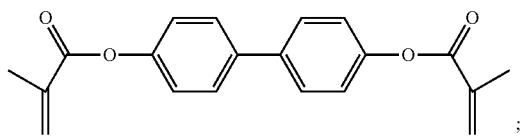

and
RM-B2 has a formula as follows:

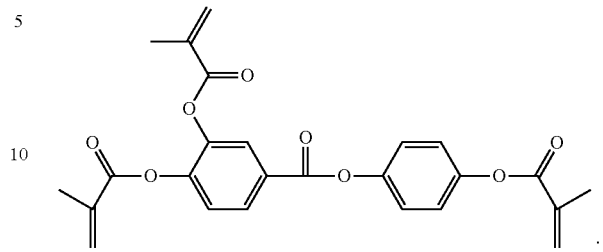

Molar ratio between RM-A2 and RM-B2 is 2:5 and the total amount of the two is 3000 ppm of the liquid crystal medium composition. In the liquid crystal medium composition, polymer bumps formed by using the mixture of RM-A2 and RM-B2 has a small size and is homogenous and shows no dark state lighting phenomenon.

Example 3

In this example, the negative type liquid crystal material and stabilizer used are identical to those of Example 1. The two polymerizable monomers used are respectively referred to as RM-A3 and RM-B3, wherein RM-A3 has a formula as follows:

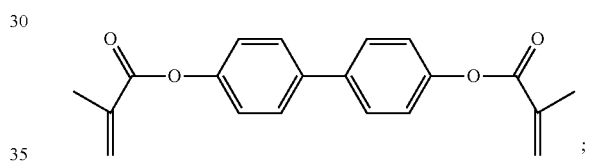

and
RM-B3 has a formula as follows:

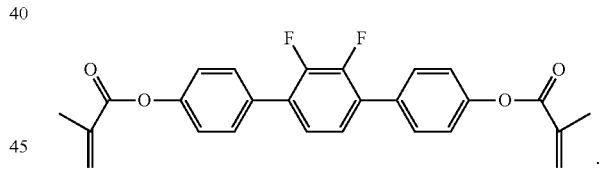

Molar ratio between RM-A3 and RM-B3 is 4:1 and the total amount of the two is 2500 ppm of the liquid crystal medium composition. In the liquid crystal medium composition, polymer bumps formed by using the mixture of RM-A3 and RM-B4 has a small size and is homogenous and shows no dark state lighting phenomenon.

In summary, the present invention provides a liquid crystal medium composition for use in liquid crystal display. Through use of two or more than two polymerizable monomers that undergo polymerization reactions under the radiation of ultraviolet lights in the liquid crystal medium composition and adopting a proper ratio therebetween, the size and homogeneity of polymer bumps obtained through the polymerization reactions can be controlled, whereby poor alignment of liquid crystal and the occurrence of dark state bright spots can be prevented to thus provide a liquid crystal panel with excellent optic performance, such as high contrast and high response rate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal medium composition for use in liquid crystal display, comprising: a negative liquid crystal material, a stabilizer, and two or more than two polymerizable monomers that undergo polymerization reactions under UV radiation, the polymerizable monomers being in an amount of 0.1-1% by weight based on total weight of the liquid crystal medium composition, the polymerizable monomers having a structural formula composed of a single benzene ring, two benzene rings, or a naphthalene ring, the structural formula composed of two benzene rings being formed by two benzene rings that are directly linked or linked via a moiety, the benzene ring and naphthalene ring being linked to at least one polymerizable moiety;

wherein the two or more than two polymerizable monomers have a structural formula represented by at least one of the following formulas and the two or more than two polymerizable monomers have different moiety numbers when the structural formulas are identical:

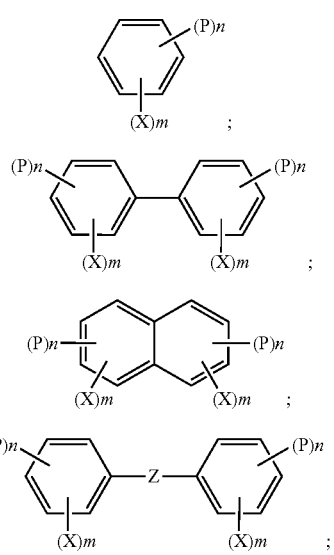

wherein in formulas I to IV, P represents a polymerizable moiety that is selected from at least one of acrylate, ethenyl, ethyleneoxy or epoxy groups; n is the number of polymerizable moiety P linked to the same aromatic ring, n being an integer of 1-3, each polymerizable moiety being identical or different when n>1; X represents a substituted moiety selected from at least one of —F, —Cl, —Br, methyl, —CN, and C2-8 linear or branched alkyl, one or more of non-adjacent methyls in the alkyl being selectively substituted by oxygen or sulfur; m represents the number of substituted moiety X that is linked to the same aromatic ring, m being an integer of 1-3, each substituted moiety being identical or different when m>1; n+m is smaller than the number of moieties on the same aromatic ring;

where in formula IV, Z represents —O—, —COO—, —OCO—, —CH$_2$O—, —OCH$_2$O—, —O(CH$_2$)$_2$O—, —COCH$_2$—, methylenyl, —C≡C—,

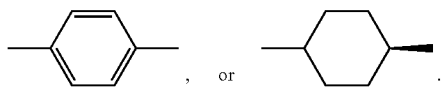

2. The liquid crystal medium composition for use in liquid crystal display as claimed in claim 1, wherein hydrogen of any one aromatic ring of the polymerizable monomers is substituted by one of the following moieties: —F, —Cl, —Br, methyl, or —CN.

3. The liquid crystal medium composition for use in liquid crystal display as claimed in claim 1, wherein hydrogen of any non-aromatic ring of the polymerizable monomers is substituted by one of the following moieties: —F, —Cl, —Br, or methyl.

4. The liquid crystal medium composition for use in liquid crystal display as claimed in claim 1, wherein the negative liquid crystal material comprises at least one liquid crystal compound represented by the following formula:

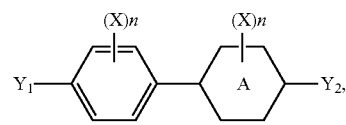

wherein

is

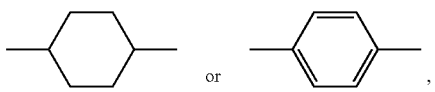

X represents the substituted moieties linked to the rings and is selected from at least one of —H, —F, —Cl, —Br, —I, —CN, and —NO$_2$; n is an integer of 1-4, n being identical or different for different rings, the substituted moieties X being identical or different when n>1; Y$_1$ and Y$_2$ are —R, —O—R, —CO—R, —OCO—R, —COO—R, or —(OCH$_2$CH$_2$)$_{n1}$CH$_3$, R representing a C1-12 linear or branched alkyl, n1 being an integer of 1-5, Y$_1$ and Y$_2$ being identical or different.

5. The liquid crystal medium composition for use in liquid crystal display as claimed in claim 1, wherein the stabilizer comprises at least one compound represented by the following formula:

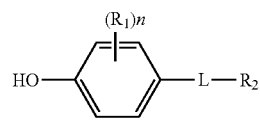

wherein R$_1$ represents at least one of C1-9 linear or branched alkyl, n being an integer of 1-4, the substituted moieties R$_1$ being identical or different when n>1; R$_2$ represents a C1-36 linear or branched alkyl; and L is a carbon—carbon single bond, —O—, —COO—, —OCO—, —CH$_2$O—, —OCH$_2$O—, —O(CH$_2$)$_2$O—, —COCH$_2$—, or methylenyl.

6. The liquid crystal medium composition for use in liquid crystal display as claimed in claim 1, wherein the polymerizable monomers are selected from two or three of the following structural formulas:

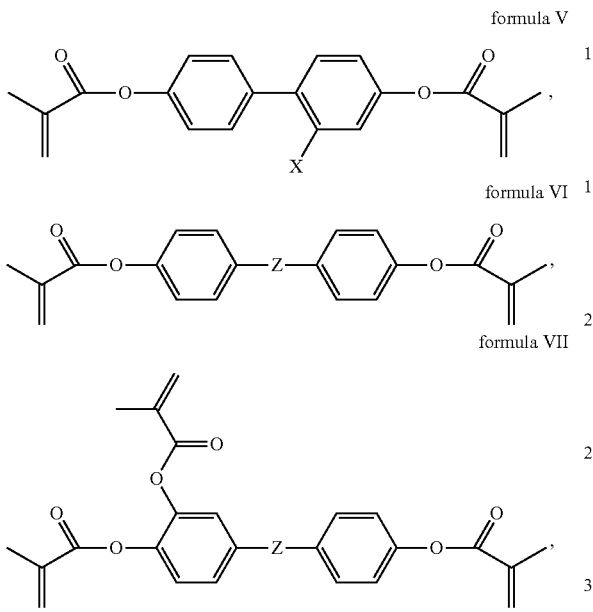

formula V formula VI formula VII wherein in formula V, X is —F or —CN; in formulas VI and VII, Z is —O—, —COO—, —OCO—, —CH$_2$O—, —OCH$_2$O—, —O(CH$_2$)$_2$O—, —COCH$_2$—, methylenyl, —C≡C—,

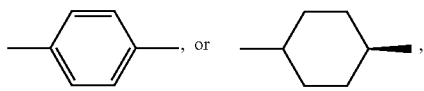

any one of said two or three of the polymerizable monomers having a molar ratio less than or equal to 98% based on the total weight.

7. The liquid crystal medium composition for use in liquid crystal display as claimed in claim 4, wherein the negative liquid crystal material comprises:

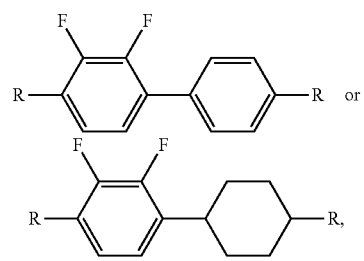

wherein in the above formulas, R is a C1-9 linear or branched alkyl, one or more of non-adjacent methyls in the alkyl being selectively substituted by oxygen or sulfur; the negative type liquid crystal material is in an amount of 20-90% by weight based on the total weight of the liquid crystal medium composition.

8. The liquid crystal medium composition for use in liquid crystal display as claimed in claim 5, wherein the stabilizer comprises at least one compound represented by the following formula:

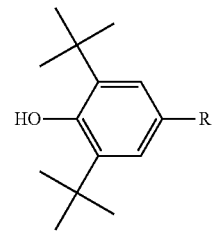

wherein R is a C1-30 linear or branched alkyl, one or more of non-adjacent methyls in the alkyl being selectively substituted by oxygen or sulfur.

9. The liquid crystal medium composition for use in liquid crystal display as claimed in claim 1, wherein the stabilizer is in an amount less than 1% by weight based on the total weight of the liquid crystal medium composition.

10. A liquid crystal medium composition for use in liquid crystal display, comprising: a negative liquid crystal material, a stabilizer, and two or more than two polymerizable monomers that undergo polymerization reactions under UV radiation, the polymerizable monomers being in an amount of 0.1-1% by weight based on total weight of the liquid crystal medium composition, the polymerizable monomers having a structural formula composed of a single benzene ring, two benzene rings, or a naphthalene ring, the structural formula composed of two benzene rings being formed by two benzene rings that are directly linked or linked via a moiety, the benzene ring and naphthalene ring being linked to at least one polymerizable moiety;

wherein the two or more than two polymerizable monomers have a structural formula represented by at least one of the following formulas and the two or more than two polymerizable monomers have different moiety numbers when the structural formulas are identical:

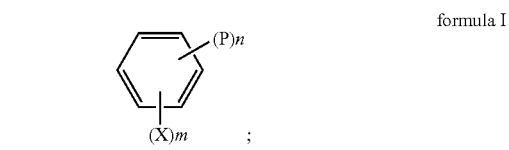

formula I

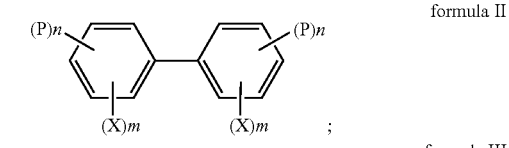

formula II

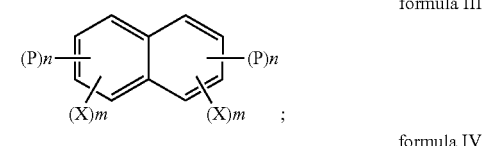

formula III

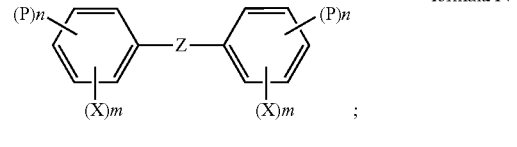

formula IV wherein in formulas I to IV, P represents a polymerizable moiety that is selected from at least one of acrylate, ethenyl, ethyleneoxy or epoxy groups; n is the number of polymerizable moiety P linked to the same aromatic ring, n being an integer of 1-3, each polymerizable moiety being identical or different when n>1; X represents a substituted moiety selected from at least one of —F, —Cl, —Br, methyl, —CN, and C2-8 linear or branched alkyl, one or more of non-adjacent methyls in the alkyl being selectively substituted by oxygen or sulfur; m represents the number of substituted moiety X that is linked to the same aromatic ring, m being an integer of 1-3, each substituted moiety being identical or different when m>1; n+m is smaller than the number of moieties on the same aromatic ring;

where in formula IV, Z represents —O—, —COO—, —OCO—, —CH$_2$O—, —OCH$_2$O—, —O(CH$_2$)$_2$O—, —COCH$_2$—, methylenyl, —C≡C—,

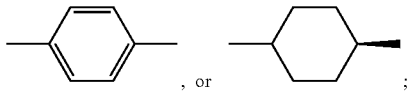, or ;

wherein hydrogen of any one aromatic ring of the polymerizable monomers is substituted by one of the following moieties: —F, —Cl, —Br, methyl, or —CN;

wherein hydrogen of any non-aromatic ring of the polymerizable monomers is substituted by one of the following moieties: —F, —Cl, —Br, or methyl;

wherein the negative liquid crystal material comprises at least one liquid crystal compound represented by the following formula:

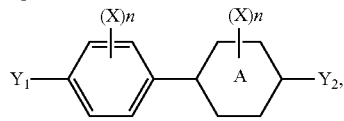

wherein

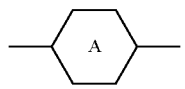

is

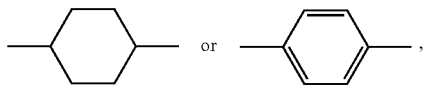,

X represents the substituted moieties linked to the rings and is selected from at least one of —H, —F, —Cl, —Br, —I, —CN, and —NO$_2$; n is an integer of 1-4, n being identical or different for different rings, the substituted moieties X being identical or different when n>1; Y$_1$ and Y$_2$ are —R, —O—R, —CO—R, —OCO—R, —COO—R, or —(OCH$_2$CH$_2$)$_{m1}$CH$_3$, R representing a C1-12 linear or branched alkyl, n1 being an integer of 1-5, Y$_1$ and Y$_2$ being identical or different;

wherein the stabilizer comprises at least one compound represented by the following formula:

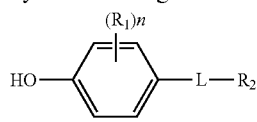

wherein R$_1$ represents at least one of C1-9 linear or branched alkyl, n being an integer of 1-4, the substituted moieties R$_1$ being identical or different when n>1; R$_2$ represents a C1-36 linear or branched alkyl; and L is a carbon—carbon single bond, —O—, —COO—, —OCO—, —CH$_2$O—, —OCH$_2$O—, —O(CH$_2$)$_2$O—, —COCH$_2$—, or methylenyl;

wherein the polymerizable monomers are selected from two or three of the following structural formulas:

formula V

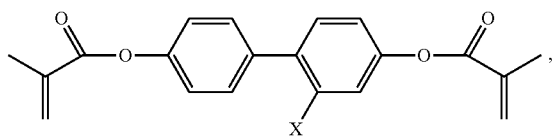

formula VI

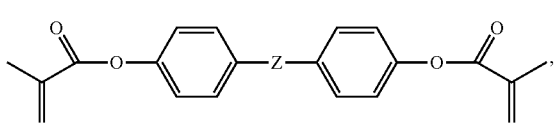

formula VII

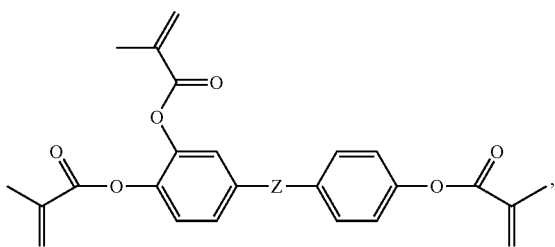

wherein in formula V, X is —F or —CN; in formulas VI and VII, Z is —O—, —COO—, —OCO—, —CH$_2$O—, —OCH$_2$O—, —O(CH$_2$)$_2$O—, —COCH$_2$—, methylenyl, —C≡C—,

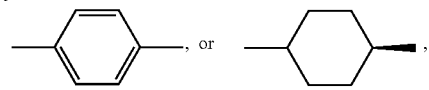

any one of said two or three of the polymerizable monomers having a molar ratio less than or equal to 98% based on the total weight;

wherein the negative liquid crystal material comprises:

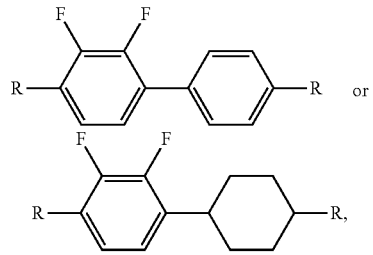

wherein in the above formulas, R is a C1-9 linear or branched alkyl, one or more of non-adjacent methyls in the alkyl being selectively substituted by oxygen or sulfur; the negative type liquid crystal material is in an amount of 20-90% by weight based on the total weight of the liquid crystal medium composition;

wherein the stabilizer comprises at least one compound represented by the following formula:

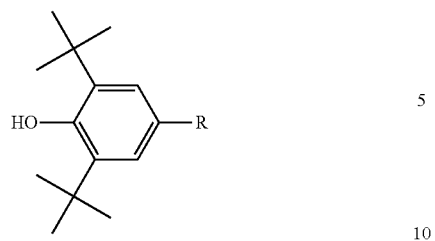
wherein R is a C1-30 linear or branched alkyl, one or more of non-adjacent methyls in the alkyl being selectively substituted by oxygen or sulfur; and
wherein the stabilizer is in an amount less than 1% by weight based on the total weight of the liquid crystal medium composition.
* * * * *